United States Patent
Jung et al.

(10) Patent No.: US 10,942,676 B2
(45) Date of Patent: Mar. 9, 2021

(54) DATA STORAGE DEVICE FOR DETERMINING A WRITE MODE, OPERATION METHOD THEREOF AND STORAGE SYSTEM HAVING THE SAME

(71) Applicant: SK hynix Inc., Gyeonggi-do (KR)

(72) Inventors: Hoe Seung Jung, Seoul (KR); Joo Young Lee, Seoul (KR)

(73) Assignee: SK hynix Inc., Gyeonggi-do (KR)

(*) Notice: Subject to any disclaimer, the term of this patent is extended or adjusted under 35 U.S.C. 154(b) by 84 days.

(21) Appl. No.: 16/212,114

(22) Filed: Dec. 6, 2018

(65) Prior Publication Data

US 2020/0026465 A1 Jan. 23, 2020

(30) Foreign Application Priority Data

Jul. 17, 2018 (KR) .................. 10-2018-0082694

(51) Int. Cl.
*G06F 3/06* (2006.01)

(52) U.S. Cl.
CPC .......... *G06F 3/0659* (2013.01); *G06F 3/0604* (2013.01); *G06F 3/0634* (2013.01); *G06F 3/0673* (2013.01)

(58) Field of Classification Search
CPC .... G06F 3/0604; G06F 3/0634; G06F 3/0659; G06F 3/0673; G06F 3/0605; G06F 3/061
See application file for complete search history.

(56) References Cited

U.S. PATENT DOCUMENTS

| | | | | |
|---|---|---|---|---|
| 2008/0141067 | A1* | 6/2008 | Nautiyal | G11C 29/84 714/6.12 |
| 2015/0324135 | A1* | 11/2015 | Chan | G06F 3/0653 711/114 |
| 2017/0160952 | A1* | 6/2017 | Nakanishi | G06F 3/0611 |
| 2017/0357600 | A1* | 12/2017 | Moon | G06F 12/0891 |
| 2018/0011660 | A1* | 1/2018 | Lesartre | G06F 3/0679 |

FOREIGN PATENT DOCUMENTS

| | | |
|---|---|---|
| KR | 1020140142759 | 12/2014 |
| KR | 1020150017599 | 2/2015 |

* cited by examiner

*Primary Examiner* — Jane Wei
(74) *Attorney, Agent, or Firm* — IP & T Group LLP (57) ABSTRACT

A data storage device includes a storage unit; and a controller configured to select a write mode by analyzing a tendency of commands received from a host device, and operate in the selected write mode to write data to the storage or to read data from the storage.

14 Claims, 6 Drawing Sheets

DATA STORAGE DEVICE FOR DETERMINING A WRITE MODE, OPERATION METHOD THEREOF AND STORAGE SYSTEM HAVING THE SAME

CROSS-REFERENCE TO RELATED APPLICATION

The present application claims priority under 35 U.S.C. § 119(a) to Korean application number 10-2018-0082694, filed on Jul. 17, 2018, in the Korean Intellectual Property Office, which is incorporated herein by reference in its entirety.

BACKGROUND

1. Technical Field

Various embodiments generally relate to a semiconductor integrated device, and more particularly, to a data storage device, an operation method thereof and a storage system including the same.

2. Related Art

A storage device connected to a host device is accessed according to a request of the host device. The storage device may use various storage media to store data. In particular, more and more portable information devices employ a high-capacity storage medium to provide various functions based on data.

Since a storage medium using a flash memory has high capacity, nonvolatile characteristic, low price and low power consumption and provides a high data processing speed, the demand for the flash memory is continuously increasing.

The flash memory may be implemented as a solid state drive (SSD)-type memory, an embedded-type memory, or a mobile-type memory, and applied to various electronic devices.

With the continued development of electronic devices, storage media used therein are required to have higher capacity, higher integration density, smaller size, higher performance and higher speed. The data processing speed of a storage medium which is used to process large data is a main factor in determining the performance of the storage medium.

SUMMARY

In an embodiment, a data storage device may include: a storage; and a controller configured to select a write mode by analyzing a tendency of commands received from a host device, and operate in the selected write mode to write data to the storage or to read data from the storage.

In an embodiment, a data storage device may include: a storage; a controller configured to control data exchange with the storage in response to commands received from a host device; a command analyzer configured to analyze the commands; a workload analyzer configured to analyze a tendency of the commands based on the analysis result of the command analyzer; and a write mode decision component configured to select a write mode which supports a program suspend function or a write mode which does not support the program suspend function based on the analysis result of the workload analyzer.

In an embodiment, there is provided an operation method of a data storage device which includes a storage and a controller for controlling data exchange with the storage unit. The operation method may include the steps of: analyzing a tendency of commands received from a host device; and selecting a write mode based on a result of the analyzing operation.

In an embodiment, a storage system may include: a host device; and a data storage device comprising a storage and a controller configured to write data to the storage or read data from the storage, wherein the controller selects a write mode by analyzing a tendency of commands received from the host device, and operates in the selected write mode to write data to the storage.

In an embodiment, a data storage device may include: a storage; and a controller suitable for controlling the storage to perform a write operation and a read operation, wherein the controller is suitable for: receiving commands from a host device; determining a tendency of write and read commands included in the received commands in a set period; generating a program command, selected from a normal program command and a cache program command, based on the determined tendency; and providing the storage with the selected program command, wherein the storage is suitable for: in response to the cache program command, caching data corresponding to a current program command while writing data corresponding to a previous program command; and in response to the normal program command, after completing writing data corresponding to the previous program command, writing data corresponding to the current program command.

DETAILED DESCRIPTION

A data storage device, an operation method thereof and a storage system including the same according to embodiments of the present disclosure will be described below with reference to the accompanying drawings. Throughout the specification, reference to "an embodiment" and the like is not necessarily to only one embodiment, and different references to any such phrase are not necessarily to the same embodiment(s).

Figure 1:
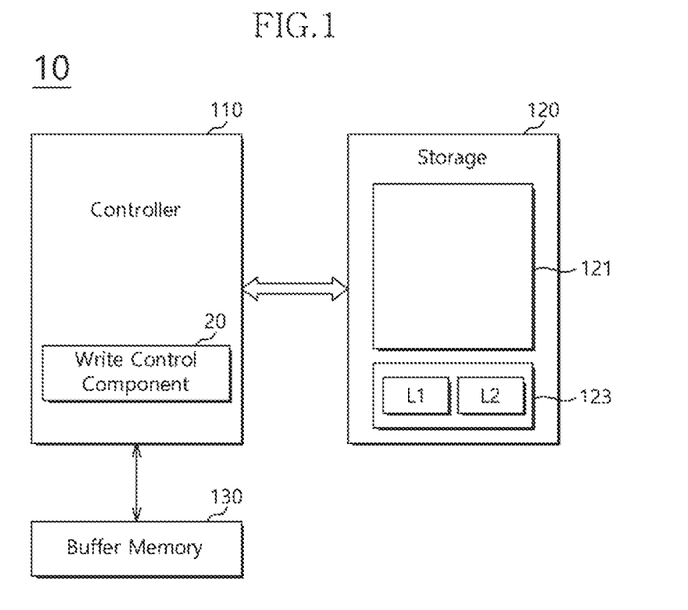
FIG. 1 is a diagram illustrating a data storage device in accordance with an embodiment.

FIG. 1 is a diagram illustrating a data storage device 10 in accordance with an embodiment.

Referring to FIG. 1, the data storage device 10 may include a controller 110 and a storage 120. The data storage device 10 may further include a buffer memory 130. The buffer memory 130 may be installed within or external to the controller 110.

The controller 110 may control the storage 120 in response to a request of a host device. For example, the controller 110 may program data to the storage 120 according to a program (or write) request of the host device. Furthermore, the controller 110 may provide data stored in the storage 120 to the host device in response to a read request of the host device.

The storage 120 may write data or output written data according to control of the controller 110. The storage 120 may include a volatile memory or a nonvolatile memory. In an embodiment, the storage 120 may be implemented with any of various memory devices such as an electrically erasable and programmable read only memory (ROM) (EEPROM), NAND flash memory, NOR flash memory, phase-change random access memory (RAM) (PRAM), resistive RAM (ReRAM or RRAM), ferroelectric RAM (FRAM) and spin torque transfer magnetic RAM (STT-MRAM). The storage 120 may include a plurality of dies, a plurality of chips or a plurality of packages. Furthermore, the storage 120 may include single-level cells each configured to store one bit of data and/or multi-level cells each configured to store multiple bits of data.

In an embodiment, the storage 120 may include a memory cell array 121 and a page buffer 123.

The memory cell array 121 may include a plurality of memory cells connected between a plurality of word lines and a plurality of bit lines.

The page buffer 123 may include a plurality of registers, for example, first and second registers L1 and L2.

The page buffer 123 may include read/write circuits corresponding to the respective bit lines of the memory cell array 121. During a write operation, data provided from the host device may be transferred to the page buffer 123 through the controller 110, and then written to the memory cell array 121. During a read operation, data read from the memory cell array 121 may be loaded to the page buffer 123, and then provided to the host device through the controller 110.

During the write and read operations, one or more of the plurality of registers may be used.

The buffer memory 130 may serve as a space for temporarily storing data when the data storage device 10 performs a series of operations of writing or reading the data in connection with the host device. FIG. 1 illustrates that the buffer memory 130 is positioned outside the controller 110. However, the buffer memory 130 may be positioned within the controller 110.

The controller 110 may include a write control component 20, which may be configured to decide a write mode according to a result obtained by analyzing the tendency of host commands, when the data storage device 10 operates in response to the host commands. The tendency of host commands may be, for example, the relative percentages of write and non-write, e.g., read, commands received in a set period of time, or that a certain number of one type of command has been received in a row.

In an embodiment, the write control component 20 may perform a write operation in a first write mode, when write-oriented commands are provided by the host device as the host commands. In an embodiment, the write control component 20 may perform a write operation in a second write mode, when a mix of write and read commands are provided as the host commands.

In an embodiment, the first write mode may be referred to as "cache program mode" indicating a write mode in which second data to be written in a next write operation are stored in the page buffer 123 while first data are written to the memory cell array 121 from the page buffer 123 of the storage 120.

When in the cache program mode, any one of the plurality of registers, for example, the first register L1, may operate as a main register (or latch), and the other of the plurality of registers, for example, the second register L2 may operate as a cache register (or latch). Since the cache register L2 is not used while data of the main register L1 are written to the memory cell array 121, data to be programmed in a next write operation, i.e., data to be programmed next time, may be inputted to the cache register L2 in advance.

In an embodiment, the second write mode may be referred to as "normal program mode" indicating a write mode in which second data to be written in a next program operation, i.e., written next time, are stored in the page buffer 123 after first data have been completely written to the memory cell array 121 of the storage 120. In the normal program mode, the cache register L2 may not be used.

The write operation for the memory cell array 121 may be performed on a page basis. In this case, the first and second data may correspond to page-based write data.

The first write mode, i.e., the cache program mode, may not support a program suspend function, while the second write mode, i.e., the normal program mode, may support the program suspend function.

The program suspend function may be a function of preferentially processing another operation with a higher priority while a write operation is temporarily suspended in response to a suspend command of the controller 110, and resuming the write operation in response to a resume command of the controller 110.

The operation with a higher priority than the write operation may include a read operation.

Therefore, the write control component 20 may analyze a workload based on host commands, and select the normal program mode as the write mode, in order to preferentially process read commands rather than write commands in a workload in which a mix of write and read commands are received.

When the data storage device 10 operates in the normal program mode, the write control component 20 may temporarily suspend a write operation to process a read command, in the case where the read command is provided while a write command is executed. The temporarily suspended write operation may be resumed in response to the resume command of the controller 110.

However, such a situation in which a write command is not processed in order to preferentially process a read command may last a relatively long period of time. For example, a program suspended situation may occur a number of times in a row, or a number of read commands may be consecutively provided in a program suspended situation. When the write command is continuously held while only the read commands are processed, the write performance may be weakened to negatively affect the reliability of the data storage device 10.

Therefore, when it is determined that the workload is a mix of write and read commands thereby suspending write command execution, the write control component 20 may set the write mode to the cache program mode, and thus guarantee the write performance. After performing a write operation in the cache program mode, the write control component 20 may analyze the tendency of commands, and decide whether to maintain the cache program mode or switch to the normal program mode.

When the workload analysis result indicates that write-oriented commands are provided from the host device, the write control component 20 may select the cache program mode focused on the write speed improvement as the write mode, because the need for the program suspend function is low.

Figure 2:
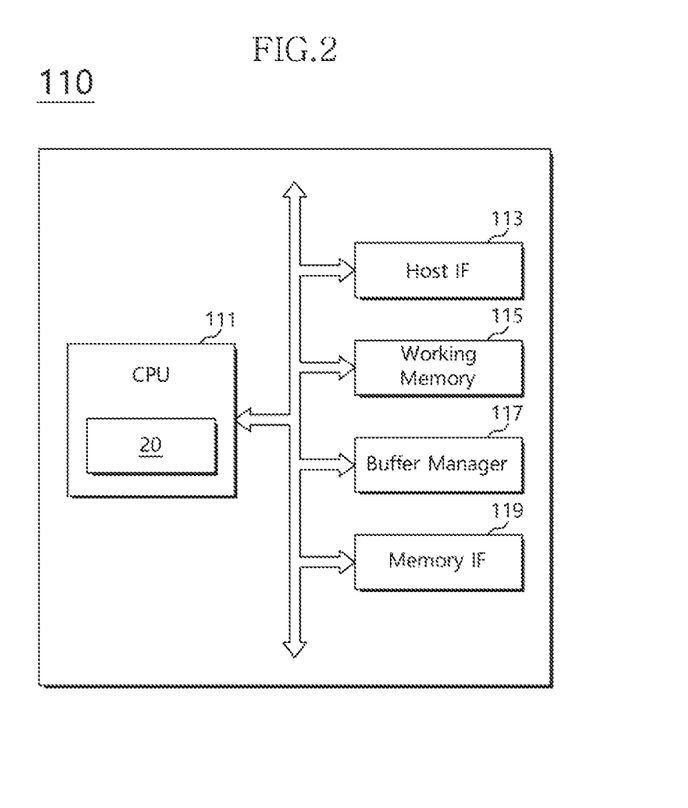
FIG. 2 is a diagram illustrating a controller in accordance with an embodiment.

FIG. 2 is a diagram illustrating a controller, e.g., the controller 110 of FIG. 1, in accordance with an embodiment.

Referring to FIG. 2, the controller 110 may include a central processing unit (CPU) 111, a host interface (IF) 113, a working memory 115, a buffer manager 117 and a memory interface (IF) 119.

The CPU 111 may be configured to transfer various items of control information to the host interface 113, the working memory 115, the buffer manager 117 and the memory interface 119. The various items of control information are used for reading or writing data from or to the storage 120. In an embodiment, the CPU 111 may be operated according to firmware which is provided for various operations of the data storage device 10. In an embodiment, the CPU 111 may execute a function of a flash translation layer (FTL) for performing a garbage collection operation, address mapping operation or wear-leveling operation for managing the storage 120. Depending on implementations, the CPU 111 may detect an error of data read from the storage 120, and correct the detected error.

The host interface 113 may receive a command and clock signal from a host device (or host processor), and provide a communication channel for controlling data input/output, according to control of the CPU 111. In particular, the host interface 113 may provide a physical connection between the host device and the data storage device 10. Furthermore, the host interface 113 may interface the data storage device 10 in response to the bus formation of the host device. The bus format of the host device may include one or more of standard interface protocols such as secure digital, universal serial bus (USB), multi-media card (MMC), embedded MMC (eMMC), personal computer memory card international association (PCMCIA), parallel advanced technology attachment (PATA), serial advanced technology attachment (SATA), small computer system interface (SCSI), serial attached SCSI (SAS), peripheral component interconnection (PCI), PCI Express (PCI-e or PCIe) and universal flash storage (UFS).

The working memory 115 may store program codes required for an operation of the controller 110, for example, firmware or software. Furthermore, the working memory 115 may store code data used by the program codes.

The buffer manager 117 may be configured to temporarily store data in the buffer memory 130 during a program or read operation. The data is exchanged between the host device and the storage 120.

The buffer manager 117 may be configured to manage the usage status of the buffer memory 130.

The memory interface 119 may provide a communication channel for transmitting and receiving signals between the controller 110 and the storage 120. The memory interface 119 may write data to the storage 120 according to control of the CPU 111. The data may be temporarily stored in the buffer memory 130. Furthermore, the memory interface 119 may transfer data read from the storage 120 to the buffer memory 130 to temporarily store the data.

The write control component 20 may be configured to decide the write mode according to a result obtained by analyzing the tendency of host commands, e.g., the relative percentages of write and read commands being received from the host, when the data storage device 10 operates in response to the host commands.

Figure 3:
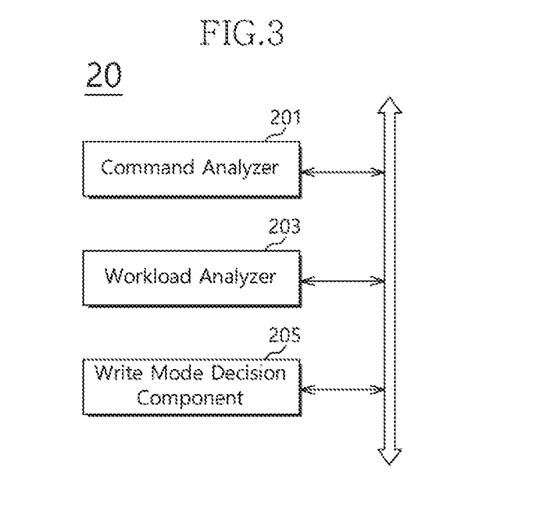
FIG. 3 is a diagram illustrating a write control component in accordance with a present embodiment.

FIG. 3 is a diagram illustrating a write control component, e.g., the write control component 20 of FIG. 1, in accordance with an embodiment.

Referring to FIG. 3, the write control component 20 may include a command analyzer 201, a workload analyzer 203 and a write mode decision component 205.

The command analyzer 201 may be configured to parse commands provided from the host device. The host commands may include a write command, a read command, and the like. The data obtained by the command analyzer 201 in parsing the commands, which data may indicate the type of each command, may be stored in a command queue in the CPU 111 or the controller 110. When the controller 110 is ready to execute a command, a command stored in the command queue may be fetched and processed.

The workload analyzer 203 may determine the tendency of the commands provided from the host device by referring to the parsing result of the command analyzer 201. That is, the workload analyzer 203 may analyze a workload according to the commands provided by the host device.

In an embodiment, the workload analyzer 203 may analyze whether write commands are mainly provided from the host device or a mix of write and read commands are provided from the host device.

The write mode decision component 205 may select either the cache program mode or the normal program mode as the write mode based on the analysis result of the workload analyzer 203.

In an embodiment, the write mode decision component 205 may select the cache program mode when the analysis result of the host commands indicates that they mostly include write commands. When analysis of the host commands indicates that a mix of write and read commands are being provided, the write mode decision component 205 may select the normal program mode.

The write mode decided by the write control component 20 may be not only applied when the host device executes a write command, but also applied during a background operation of the data storage device 10, which is accompanied by the write operation. The background operation accompanied by the write operation may include a garbage collection operation, a copy-back operation and the like.

The workload analyzer 203 may determine whether the corresponding workload is suspending write command execution for a relatively long time, in the case in which the received host commands are a mix of write and read commands. That is, in such instance, the workload analyzer 203 may determine that the corresponding workload is deprived of write command execution. For example, when a program suspended situation occurs a set number of times or more in a row and a set number of read commands or more are consecutively provided in a program suspended situation, the workload analyzer 203 may determine that the corresponding workload is deprived of write command execution, that is, overly favoring execution of other commands, e.g., read commands at the expense of write command execution. In this case, the write mode decision component 205 may set the write mode to the cache program mode.

In an embodiment, the write control component 20 may decide the write mode by analyzing host commands in each set cycle.

Figure 4:
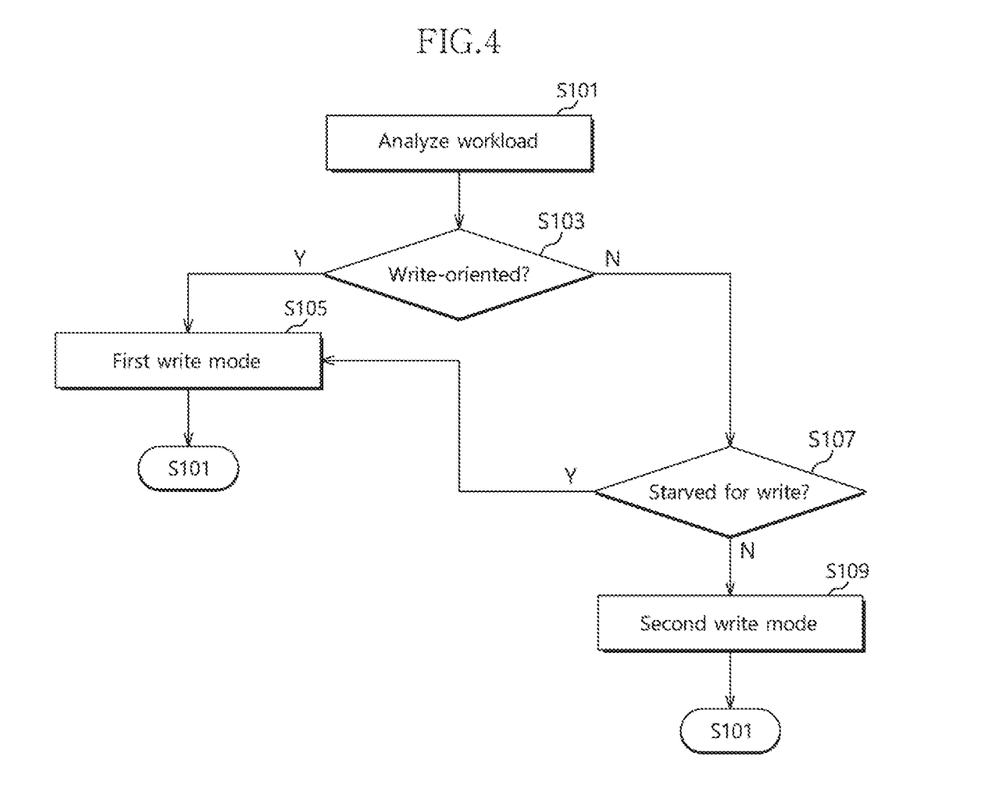
FIG. 4 is a flowchart illustrating an operation method of a data storage device in accordance with an embodiment.

FIG. 4 is a flowchart illustrating an operation method of a data storage device, e.g., the data storage device 10 of FIGS. 1 to 3, in accordance with an embodiment.

Referring to FIG. 4, the data storage device 10 may input/output data in response to a command provided from the host device.

At step S101, the write control component 20 may analyze commands provided from the host device, in order to analyze the tendency of the commands, i.e., the relative percentage of write commands to other command, such as read commands, which is indicative of a workload.

In order to analyze the tendency of the host commands, the write control component 20 may compare the ratio of write commands to read commands with a threshold value. Alternatively, the write control component 20 may also analyze the workload by considering a time interval between the read commands and the size of read data, or other factor indicating the processing of read commands relative to other, e.g., write commands.

At step S103, the write control component 20 may determine whether write-oriented commands are provided, based on the host command analysis result. When write-oriented commands are provided (Y at step S103), the write control component 20 may select the first write mode (i.e., cache program mode) as the write mode at step S105. After selecting the write mode, the write control component 20 may return to the workload analysis step S101 to consider whether there has been a change of the workload.

When the analysis result of the host command indicates that a mix of write commands and read commands are provided (N at step S103), the write control component 20 may determine whether the workload is deprived write command execution at step S107. That is, the write control component 20 may determine whether the workload is overly favoring execution of non-write, e.g., read commands, which is, or soon may be, negatively affecting system performance.

When it is determined that a mix of write and read commands are provided and the workload is deprived of write command execution (Y at step S107), it may indicate that the write commands are being held for a relatively long period of time, in order to preferentially process the read commands. In this case, at step S105, the write control component 20 may select the first write mode e.g., the cache program mode, to execute the held write commands.

When both write and read commands are provided and the workload is not deprived of write command execution (N at step S107), the write control component 20 may select the second write mode, e.g., the normal program mode, at step S109. After selecting the write mode, the write control component 20 may return to the step S101, i.e., the workload analysis step to consider whether there has been a change of the workload.

In an embodiment, the write control component 20 may check whether a program suspended situation has occurred a set number of times or more in a row, check whether a set number of read commands have been consecutively provided in a program suspended state, or compare the ratio of processed write commands to processed read commands with a set threshold value, in order to determine whether the workload is deprived of write command execution.

The method and reference for deciding a workload and the method and reference value for determining whether the workload is deprived of write command execution may be selected from various methods and values, and modified in various ways.

Figure 5A:
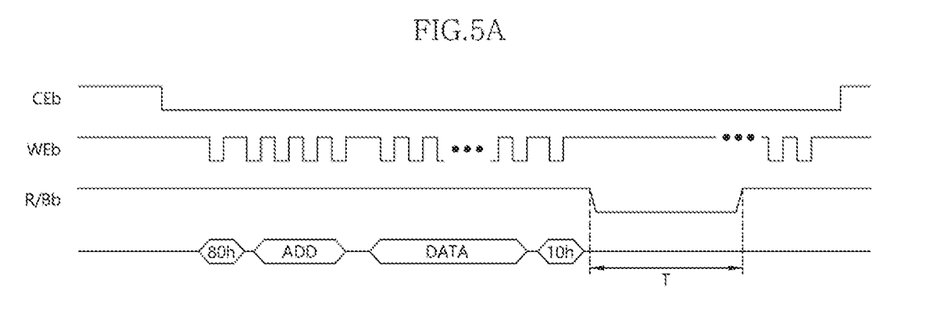
FIGS. 5A and 5B illustrate operation methods for write modes in accordance with an embodiment.
Figure 5B:
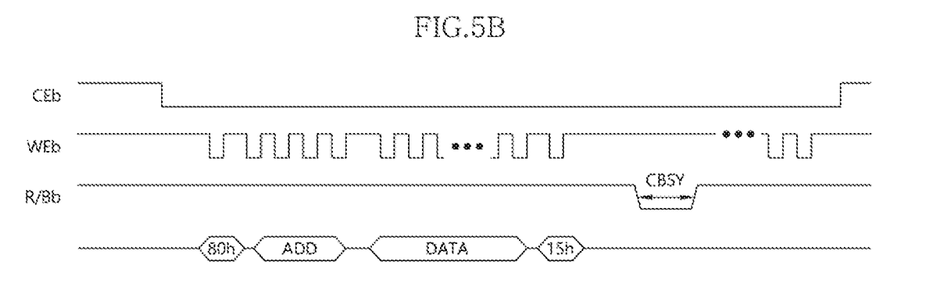

FIGS. 5A and 5B illustrate operation methods for the respective write modes a data storage device, e.g., data storage device 10 of FIGS. 1 to 3, in accordance with an embodiment for example.

FIG. 5A illustrates an operation in a normal program mode.

Referring to FIG. 5A, a chip enable bar signal CEb may be disabled, and a write enable bar signal WEb may be toggled. In response to the chip enable bar signal CEb and the write enable bar signal WEb, the controller 110 may receive a command signal 80$h$ and an address signal ADD from the host device. Further, the controller 110 may generate an internal program command PGM and an internal row and column (row/column) address signal based on the received command signal 80$h$ and address signal ADD.

In response to the internal program command, a high voltage generator installed in the storage 120 may generate bias voltages for programming. In response to the internal row/column address signal, an address decoder may supply a bias voltage to a selected memory cell block in the memory cell array 121. The page buffer 123 may latch a data signal DATA received through the memory interface 119 of the controller 110. Then, when an execution command 10$h$ is provided to the storage 120 from the controller 110, the storage 120 may disable a read/busy bar signal R/Bb for a set time T. The controller 110 may receive the ready/busy bar signal R/Bb, and recognize that the storage 120 is performing a program operation. That is, during the time T in which the ready/busy bar signal R/Bb is disabled, the program operation may be performed on one of pages included in the selected memory cell block.

FIG. 5B illustrates an operation in a cache program mode.

Referring to FIG. 5B, similar to the normal program mode of FIG. 5A, the controller 110 may receive the command signal 80$h$, the address signal ADD and the data signal DATA and temporarily store the received signals in the main register L1 of the page buffer 123, after the chip enable bar signal CEb has been disabled and the write enable bar signal WEb has been toggled. Then, as the execution command 15$h$ is provided, the data of the main register L1 may be programmed to a specific page (e.g., first page). While the program operation for the first page is performed, the storage 120 may transfer a dummy ready/busy bar signal CBSY to the controller 110. At this time, the cache register L2 of the page buffer 123 may not be used, and data to program to the next page (e.g., second page) may be inputted to the cache register L2 in advance.

When the first page is completely programmed, the data of the cache register L2 may be transferred to the main register L1, and a program operation for the second page may be performed.

The normal program mode may support the program suspend function. Therefore, when a read command is received while a write operation is performed, the write operation may be temporarily suspended, and the read command may be preferentially processed. Then, the write operation may be resumed.

However, since the cache program mode does not support the program suspend function, read latency may be degraded.

When the write operation is fixed to the normal program mode or the cache program mode without the option to switch modes, it is difficult to guarantee the optimal operation performance depending on workloads. For example, when the write operation is fixed to the cache program mode, the read latency may be degraded. In embodiments of the present invention, however, when write-oriented commands are provided, the write operation may be performed in the cache program mode. On the other hand, when a mix of write and read commands are provided, the write operation may be performed in the normal program mode. Therefore, when write-oriented commands are primarily or exclusively provided, the commands may be processed at high speed through the cache program mode. When write commands are provided, along with a significant number of read commands, the read commands may be preferentially processed to effectively reduce the read latency.

As such, a write mode suitable for performing the workload in consideration of the type and relative percentages of the commands, or consecutive number of one type of command, provided from the host device may be selected.

When write-oriented commands are provided, data may be written through the high-speed write method. When both write and read commands are provided, data may be written through the method capable of reducing read latency. Therefore, it is possible to adaptively improve the processing speed of the data storage device.

Figure 6:
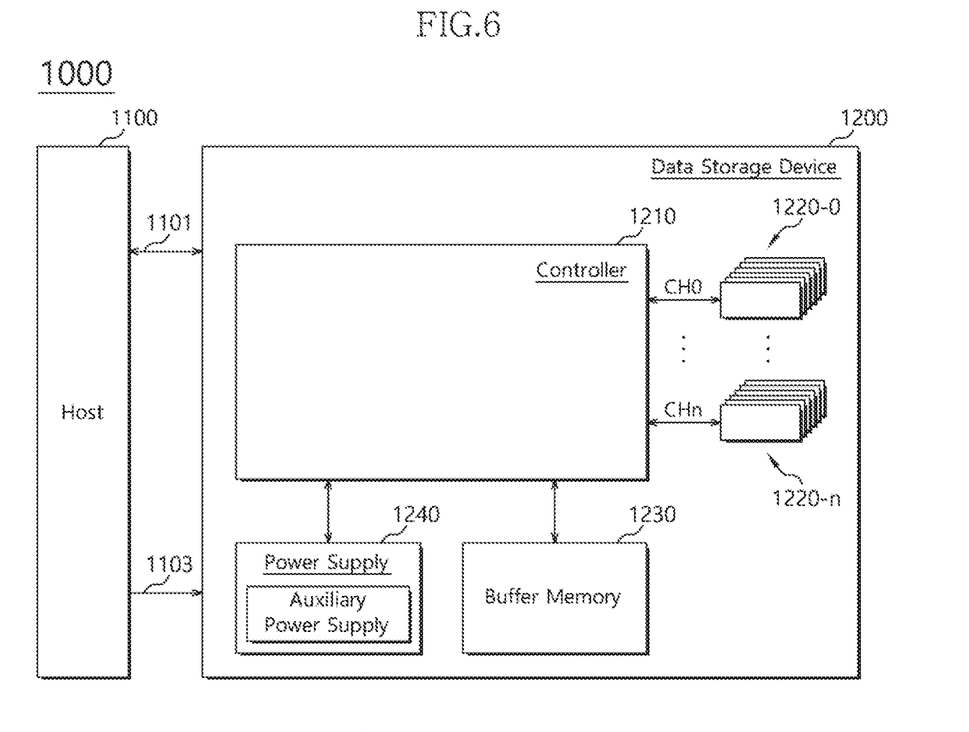
FIG. 6 is a diagram illustrating a data storage system in accordance with an embodiment.

FIG. 6 is a diagram illustrating a data storage system 1000 in accordance with an embodiment.

Referring to FIG. 6, the data storage system 1000 may include a host device 1100 and a data storage device 1200. In an embodiment, the data storage device 1200 may be configured as a solid state drive (SSD).

The data storage device 1200 may include a controller 1210, a plurality of nonvolatile memory devices 1220-0 to 1220-n, a buffer memory device 1230, a power supply 1240, a signal connector 1101, and a power connector 1103.

The controller 1210 may control general operations of the data storage device 1200. The controller 1210 may include a host interface, a control component, a random access memory used as a working memory, an error correction code (ECC) component and a memory interface. In an embodiment, the controller 1210 may be implemented by the controller 110 including the write control component 20 as shown in FIGS. 1 to 3.

The host device 1100 may exchange a signal with the data storage device 1200 through the signal connector 1101. The signal may include a command, an address, data, and the like.

The controller 1210 may analyze and process the signal received from the host device 1100. The controller 1210 may control operations of internal function blocks according to firmware or software for driving the data storage device 1200.

The buffer memory device 1230 may temporarily store data to be stored in at least one of the nonvolatile memory devices 1220-0 to 1220-n. Further, the buffer memory device 1230 may temporarily store the data read from at least one of the nonvolatile memory devices 1220-0 to 1220-n. The data temporarily stored in the buffer memory device 1230 may be transmitted to the host device 1100 or to at least one of the nonvolatile memory devices 1220-0 to 1220-n according to control of the controller 1210.

The nonvolatile memory devices 1220-0 to 1220-n may be used as storage media of the data storage device 1200. The nonvolatile memory devices 1220-0 to 1220-n may be coupled with the controller 1210 through a plurality of channels CH1 to CHn, respectively. One or more nonvolatile memory devices may be coupled to one channel. The nonvolatile memory devices coupled to the same channel may be coupled to the same signal bus and data bus.

The power supply 1240 may provide power inputted through the power connector 1103, to the inside of the data storage device 1200. The power supply 1240 may include an auxiliary power supply. The auxiliary power supply may supply power to allow the data storage device 1200 to be properly terminated when a sudden power-off occurs. The auxiliary power supply may include large capacity capacitors.

The signal connector 1101 may be configured by various types of connectors depending on an interface scheme between the host device 1100 and the data storage device 1200.

The power connector 1103 may be configured by various types of connectors depending on a power supply scheme of the host device 1100.

Figure 7:
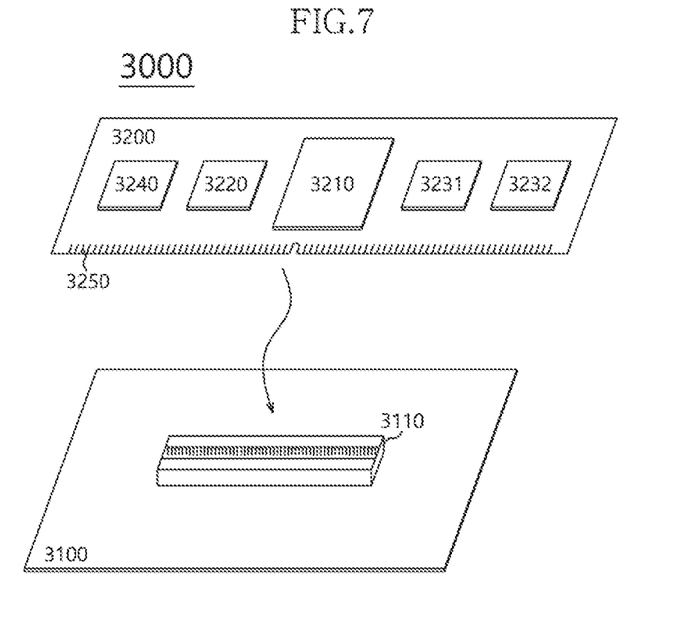
FIG. 7 and FIG. 8 are diagrams illustrating a data processing system in accordance with an embodiment.

FIG. 7 is a diagram illustrating a data processing system 3000 in accordance with an embodiment. Referring to FIG. 7, the data processing system 3000 may include a host device 3100 and a memory system 3200.

The host device 3100 may be configured in the form of a board such as a printed circuit board. Although not shown, the host device 3100 may include internal function blocks for performing the function of a host device.

The host device 3100 may include a connection terminal 3110 such as a socket, a slot or a connector. The memory system 3200 may be mounted to the connection terminal 3110.

The memory system 3200 may be configured in the form of a board such as a printed circuit board. The memory system 3200 may be referred to as a memory module or a memory card. The memory system 3200 may include a controller 3210, a buffer memory device 3220, nonvolatile memory devices 3231 and 3232, a power management integrated circuit (PMIC) 3240, and a connection terminal 3250.

The controller 3210 may control general operations of the memory system 3200. The controller 3210 may be implemented in the same manner as the controller 110 including the write control component 20 shown in FIGS. 1 to 3.

The buffer memory device 3220 may temporarily store data to be stored in the nonvolatile memory devices 3231 and 3232. Further, the buffer memory device 3220 may temporarily store the data read from the nonvolatile memory devices 3231 and 3232. The data temporarily stored in the buffer memory device 3220 may be transmitted to the host device 3100 or the nonvolatile memory devices 3231 and 3232 according to control of the controller 3210.

The nonvolatile memory devices 3231 and 3232 may be used as storage media of the memory system 3200.

The PMIC 3240 may provide the power inputted through the connection terminal 3250, to the inside of the memory system 3200. The PMIC 3240 may manage the power of the memory system 3200 according to control of the controller 3210.

The connection terminal 3250 may be coupled to the connection terminal 3110 of the host device 3100. Through the connection terminal 3250, signals such as commands, addresses, data and so forth and power may be transferred between the host device 3100 and the memory system 3200. The connection terminal 3250 may be configured into various types depending on an interface scheme between the host device 3100 and the memory system 3200. The connection terminal 3250 may be disposed on any one side of the memory system 3200.

Figure 8:
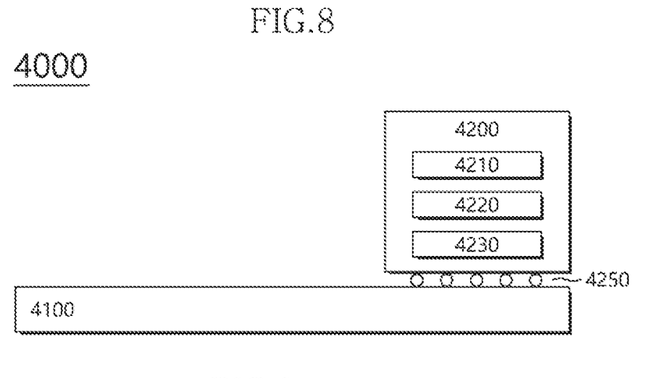

FIG. 8 is a diagram illustrating a data processing system 4000 in accordance with an embodiment. Referring to FIG. 8, the data processing system 4000 may include a host device 4100 and a memory system 4200.

The host device 4100 may be configured in the form of a board such as a printed circuit board. Although not shown, the host device 4100 may include internal function blocks for performing the function of a host device.

The memory system 4200 may be configured in the form of a surface-mounting type package. The memory system 4200 may be mounted to the host device 4100 through solder balls 4250. The memory system 4200 may include a controller 4210, a buffer memory device 4220, and a nonvolatile memory device 4230.

The controller 4210 may control general operations of the memory system 4200. The controller 4210 may be configured in the same manner as the controller 110 including the write control component 20 shown in FIGS. 1 to 3.

The buffer memory device 4220 may temporarily store data to be stored in the nonvolatile memory device 4230. Further, the buffer memory device 4220 may temporarily store the data read from the nonvolatile memory device 4230. The data temporarily stored in the buffer memory device 4220 may be transmitted to the host device 4100 or the nonvolatile memory device 4230 according to control of the controller 4210.

The nonvolatile memory device 4230 may be used as the storage medium of the memory system 4200.

Figure 9:
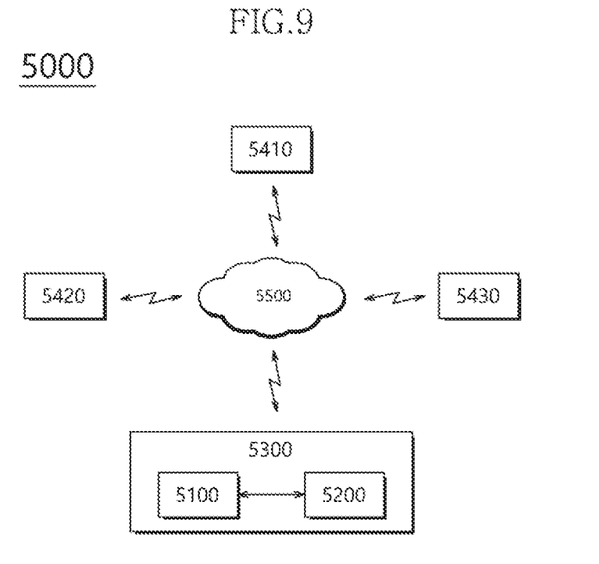
FIG. 9 is a diagram illustrating a network system including a data storage device in accordance with an embodiment.

FIG. 9 is a diagram illustrating a network system 5000 including a data storage device in accordance with an embodiment. Referring to FIG. 9, the network system 5000 may include a server system 5300 and a plurality of client systems 5410 to 5430 which are coupled through a network 5500.

The server system 5300 may service data in response to requests from the plurality of client systems 5410 to 5430. For example, the server system 5300 may store the data provided from the plurality of client systems 5410 to 5430. For another example, the server system 5300 may provide data to the plurality of client systems 5410 to 5430.

The server system 5300 may include a host device 5100 and the memory system 5200. The memory system 5200 may be implemented by the memory system 10 shown in FIG. 1, the data storage device 1200 shown in FIG. 6, the memory system 3200 shown in FIG. 7 or the memory system 4200 shown in FIG. 8.

Figure 10:
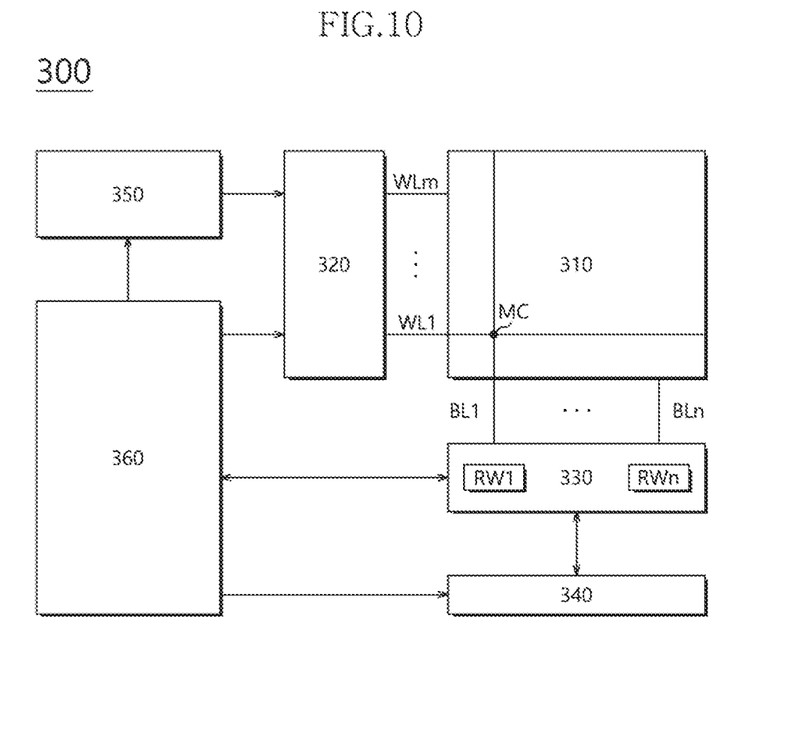
FIG. 10 is a block diagram illustrating a nonvolatile memory device included in a data storage device in accordance with an embodiment.

FIG. 10 is a block diagram illustrating a nonvolatile memory device 300 included in a data storage device in accordance with an embodiment. Referring to FIG. 10, the nonvolatile memory device 300 may include a memory cell array 310, a row decoder 320, a data read/write block 330, a column decoder 340, a voltage generator 350, and control logic 360.

The memory cell array 310 may include memory cells MC which are arranged at areas where word lines WL1 to WLm and bit lines BL1 to BLn intersect with each other.

The memory cell array 310 may comprise a three-dimensional (3D) memory array. The three-dimensional memory array has a direction extending perpendicular to the flat surface of a semiconductor substrate. Moreover, the three-dimensional memory array is a structure including NAND strings in which at least one memory cell is located in a vertical upper portion of another memory cell.

However, the structure of the three-dimensional memory array is not limited to the above-described arrangement. More generally, the 3D memory array structure can be formed in a highly integrated manner with horizontal directionality as well as vertical directionality.

The row decoder 320 may be coupled with the memory cell array 310 through the word lines WL1 to WLm. The row decoder 320 may operate according to control of the control logic 360. The row decoder 320 may decode an address provided from an external device (not shown). The row decoder 320 may select and drive the word lines WL1 to WLm, based on a decoding result. For instance, the row decoder 320 may provide a word line voltage provided from the voltage generator 350, to the word lines WL1 to WLm.

The data read/write block 330 may be coupled with the memory cell array 310 through the bit lines BL1 to BLn. The data read/write block 330 may include read/write circuits RW1 to RWn respectively corresponding to the bit lines BL1 to BLn. The data read/write block 330 may operate according to control of the control logic 360. The data read/write block 330 may operate as a write driver or a sense amplifier according to an operation mode. For example, the data read/write block 330 may operate as a write driver which stores data provided from the external device, in the memory cell array 310 in a write operation. For another example, the data read/write block 330 may operate as a sense amplifier which reads out data from the memory cell array 310 in a read operation.

The column decoder 340 may operate according to control of the control logic 360. The column decoder 340 may decode an address provided from the external device. The column decoder 340 may couple the read/write circuits RW1 to RWn of the data read/write block 330 respectively corresponding to the bit lines BL1 to BLn with data input/output lines or data input/output buffers, based on a decoding result.

The voltage generator 350 may generate voltages to be used in internal operations of the nonvolatile memory device 300. The voltages generated by the voltage generator 350 may be applied to the memory cells of the memory cell array 310. For example, a program voltage generated in a program operation may be applied to a word line of memory cells for which the program operation is to be performed. For another example, an erase voltage generated in an erase operation may be applied to a well area of memory cells for which the erase operation is to be performed. For still another example, a read voltage generated in a read operation may be applied to a word line of memory cells for which the read operation is to be performed.

The control logic 360 may control general operations of the nonvolatile memory device 300, based on control signals provided from the external device. For example, the control logic 360 may control operations of the nonvolatile memory device 300 such as read, write and erase operations of the nonvolatile memory device 300.

While various embodiments have been illustrated and described, it will be understood to those skilled in the art in light of the present disclosure that the embodiments described are examples to which various modifications may be made within the scope of the present invention. Accordingly, the data storage device, the operating method thereof, and the storage system including the same disclosed herein should not be limited based on the described embodiments. Rather, the present invention encompasses all variations and modifications that fall within the scope of the claims.

What is claimed is:

1. A data storage device comprising:
   a storage; and
   a controller configured to select a write mode by analyzing a workload based on commands received from a host device, and operate in the selected write mode to write data to the storage or to read data from the storage,
   wherein, when it is determined that the workload shows that a mix of read and write commands are received, the controller selects a normal program mode in which a next write command is processed after an operation of writing data to a memory cell of the storage according to a current write command is completed, and when it is determined that the workload is deprived of write command execution depending on how many write commands have been processed relative to how many write commands have been received in a recent set period of time, the controller selects a cache program mode in which data corresponding to the next write command are stored in a register of the storage while data corresponding to the current write command are written to a memory cell of the storage.

2. The data storage device according to claim 1, wherein the controller analyzes the workload based on a ratio of write commands to read commands in the received commands.

3. The data storage device according to claim 1, wherein, when it is determined that the workload shows that write commands are received rather than read commands, the controller selects the cache program mode.

4. The data storage device according to claim 1, wherein, when it is determined that the workload is not deprived of write command execution, the controller selects the normal program mode in which a next write command is processed after an operation of writing data to a memory cell of the storage according to a current write command is completed.

5. The data storage device according to claim 1, wherein the controller determines whether the workload is deprived of write command execution based on the ratio of processed write commands to processed read commands.

6. A data storage device comprising:
a storage;
a controller configured to control data exchange with the storage in response to commands received from a host device;
a command analyzing circuit configured to analyze the commands;
a workload analyzing circuit configured to analyze a workload of the commands based on the analysis result of the command analyzing circuit; and
a write mode decision circuit configured to select a write mode which supports a program suspend function or a write mode which does not support the program suspend function based on the analysis result of the workload analyzing circuit,
wherein, when it is determined that the workload shows that a mix of read and write commands are received, the controller selects a normal program mode in which a next write command is processed after an operation of writing data to a memory cell of the storage according to a current write command is completed, and
when it is determined that the workload is deprived of write command execution depending on how many write commands have been processed relative to how many write commands have been received in a recent set period of time, the controller selects a cache program mode in which data corresponding to the next write command are stored in a register of the storage while data corresponding to the current write command are written to a memory cell of the storage.

7. The data storage device according to claim 6, wherein, when it is determined that the workload shows that write commands are received rather than read commands, the write mode decision circuit selects the cache program mode.

8. The data storage device according to claim 6, wherein, when it is determined that the workload is not deprived of write command execution, the write mode decision circuit selects the normal program mode in which a next write command is processed after an operation of writing data to a memory cell of the storage according to a current write command is completed, wherein the normal program mode supports the program suspend function.

9. A method of operating a data storage device which includes a storage and a controller for controlling data exchange with the storage, the method comprising the steps of:
analyzing a workload based on commands received from a host device;
selecting a write mode based on a result of the analyzing operation; and
wherein the selecting of the write mode comprises:
selecting a normal program mode in which a next write command is processed after an operation of writing data to a memory cell of the storage according to a current write command is completed, when it is determined that the workload shows that a mix of read and write commands are received;
selecting a cache program mode in which data corresponding to the next write command are stored in a register of the storage while data corresponding to the current write command are written to a memory cell of the storage when it is determined that the workload is deprived of write command execution depending on how many write commands have been processed relative to how many write commands have been received in a recent set period of time.

10. The method according to claim 9, wherein the analyzing of the workload comprises determining the ratio of write commands to read commands in the commands received from the host device.

11. The method according to claim 9, wherein the selecting of the write mode comprises selecting a cache program mode in which data corresponding to a next write command are stored in a register of the storage while data corresponding to a current write command are written to a memory cell of the storage, when it is determined that the workload shows that write commands are received rather than read commands.

12. The method according to claim 9, wherein, when it is determined that the workload is not deprived of write command execution, the normal program mode is selected.

13. The method according to claim 9, wherein the controller determines whether the workload is deprived of write command execution based on the ratio of processed write commands to processed read commands.

14. A storage system comprising:
a host device; and
a data storage device comprising a storage and a controller configured to write data to the storage or read data from the storage,
wherein the controller selects a write mode by analyzing a workload based on commands received from the host device, and operates in the selected write mode to write data to the storage,
wherein, when it is determined that the workload shows that a mix of read and write commands are received, the controller selects a normal program mode in which a next write command is processed after an operation of writing data to a memory cell of the storage according to a current write command is completed, and
when it is determined that the workload is deprived of write command execution depending on how many write commands have been processed relative to how many write commands have been received in a recent set period of time, the controller selects a cache program mode in which data corresponding to the next write command are stored in a register of the storage while data corresponding to the current write command are written to a memory cell of the storage.

\* \* \* \* \*